(12) United States Patent
Takami

(10) Patent No.: US 9,275,209 B2
(45) Date of Patent: Mar. 1, 2016

(54) INFORMATION PROCESSING DEVICE, CONTROL METHOD THEREFOR, PROGRAM, AND INFORMATION STORAGE MEDIUM

(75) Inventor: Shinya Takami, Tokyo (JP)

(73) Assignee: Rakuten, Inc., Tokyo (JP)

( * ) Notice: Subject to any disclaimer, the term of this patent is extended or adjusted under 35 U.S.C. 154(b) by 63 days.

(21) Appl. No.: 14/129,599

(22) PCT Filed: Feb. 27, 2012

(86) PCT No.: PCT/JP2012/054844
§ 371 (c)(1),
(2), (4) Date: Dec. 27, 2013

(87) PCT Pub. No.: WO2013/001852
PCT Pub. Date: Jan. 3, 2013

(65) Prior Publication Data
US 2014/0150118 A1    May 29, 2014

(30) Foreign Application Priority Data
Jun. 30, 2011 (JP) ................. 2011-146891

(51) Int. Cl.
G06F 21/31    (2013.01)
G06F 21/10    (2013.01)
G06Q 30/06    (2012.01)

(52) U.S. Cl.
CPC ............. G06F 21/31 (2013.01); G06F 21/10 (2013.01); G06Q 30/0601 (2013.01)

(58) Field of Classification Search
CPC ...... G05F 21/10; G05F 21/31; G06Q 30/0601
See application file for complete search history.

(56) References Cited

U.S. PATENT DOCUMENTS

| 5,113,518 A | 5/1992 | Durst, Jr. et al. |
| 2004/0148399 A1* | 7/2004 | Fenizia et al. ................. 709/227 |
| 2006/0236125 A1* | 10/2006 | Sahita et al. ................... 713/193 |

FOREIGN PATENT DOCUMENTS

| GB | 2219421 A | 6/1989 |
| JP | 63-276125 A | 11/1988 |
| JP | 11-249967 A | 9/1999 |
| JP | 2001-356965 A | 12/2001 |

(Continued)

OTHER PUBLICATIONS

Written Opinion of the International Searching Authority dated Jan. 16, 2014 issued in Application No. PCT/JP2012/054844.

(Continued)

*Primary Examiner* — William Goodchild
(74) *Attorney, Agent, or Firm* — Sughrue Mion, PLLC

(57) ABSTRACT

To provide an information processing device that is capable of restricting the use of an application or content in an unauthorized device to which the application or the content is copied. A storage situation information storing unit (32) stores, in a storage unit (30) where an application or content is stored, storage situation information which indicates a storage situation of the application or the content at predetermined reference timing, as one of components of the application or the content. An execution restricting unit (34) restricts execution of the application or the content in a case where the execution of the application or the content is instructed and a current storage situation of the application or the content differs from a storage situation that is indicated by the storage situation information.

7 Claims, 15 Drawing Sheets

(56) References Cited

FOREIGN PATENT DOCUMENTS

| JP | 2004-282238 A | 10/2004 |
| JP | 2006-31780 A | 2/2006 |
| JP | 2006-217320 A | 8/2006 |
| KR | 2006-0050127 A | 5/2006 |

OTHER PUBLICATIONS

Korean Office Action corresponding to Korean Patent Application No. 2014-7002221 dated on May 21, 2015.

* cited by examiner

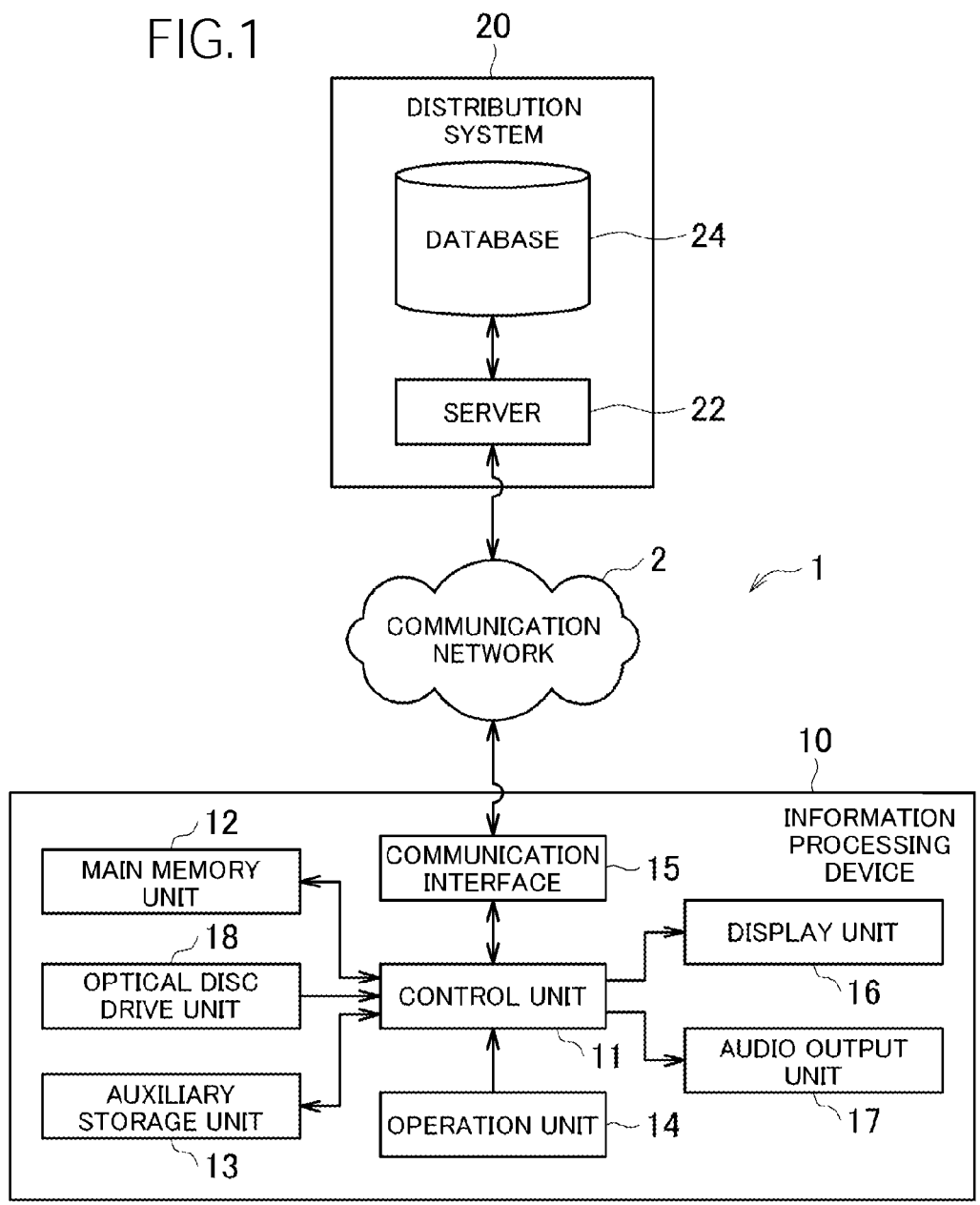

INFORMATION PROCESSING DEVICE, CONTROL METHOD THEREFOR, PROGRAM, AND INFORMATION STORAGE MEDIUM

CROSS REFERENCE TO RELATED APPLICATIONS

This application is a National Stage of International Application No. PCT/JP2012/054844, filed on Feb. 27, 2012, which claims priority from Japanese Patent Application No. 2011-146891, filed on Jun. 30, 2011, the contents of all of which are incorporated herein by reference in their entirety.

TECHNICAL FIELD

The present invention relates to an information processing device, a method of controlling an information processing device, a program, and an information storage medium.

BACKGROUND ART

Information processing devices that execute an application or content have been known. For information processing devices of this type, there has been proposed a technology for restricting the use of an application or content that is copied to other information processing devices (herein referred to as "unauthorized devices") than information processing devices (herein referred to as "authorized devices") authorized to use the application or the content.

Specifically, a technology has been proposed that restricts the use of an application or content in an unauthorized device by storing in a server the ID of an information processing device in association with the ID of the application or content that the information processing device is authorized to use and, when the application or content is in use in an information processing device, checking the combination of the ID of the information processing device and the ID of the application or the content.

CITATION LIST

Patent Literature

[Patent Literature 1] JP 2004-282238 A

SUMMARY OF INVENTION

Technical Problem

The technology described above, however, is not capable of restricting the use of an application or content if the ID of an authorized device is falsely used as the ID of an unauthorized device to which the application or the content is copied.

The present invention has been made in view of the problem described above, and provides an information processing device, a method of controlling an information processing device, a program, and an information storage medium that are capable of restricting the use of an application or content in an unauthorized device to which the application or the content is copied.

Solution to Problem

In order to solve the problem described above, an information processing device according to the present invention includes: storage situation information storing means for storing, in storage means where an application or content is stored, storage situation information which indicates a storage situation of the application or the content at predetermined reference timing, as one of components of the application or the content; and execution restricting means for restricting execution of the application or the content in a case where the execution is instructed and a current storage situation of the application or the content differs from a storage situation that is indicated by the storage situation information.

A method of controlling an information processing device according to the present invention includes: a storage situation information storing step of storing, in storage means where an application or content is stored, storage situation information which indicates a storage situation of the application or the content at predetermined reference timing, as one of components of the application or the content; and an execution restricting step of restricting execution of the application or the content in a case where the execution is instructed and a current storage situation of the application or the content differs from a storage situation that is indicated by the storage situation information.

A program according to the present invention causes a computer to function as: storage situation information storing means for storing, in storage means where an application or content is stored, storage situation information which indicates a storage situation of the application or the content at predetermined reference timing, as one of components of the application or the content; and execution restricting means for restricting execution of the application or the content in a case where the execution is instructed and a current storage situation of the application or the content differs from a storage situation that is indicated by the storage situation information.

A computer-readable information storage medium according to the present invention has the above-mentioned program stored thereon.

According to an aspect of the present invention, the storage situation information may include information that indicates a storage location of a predetermined component of the application or the content, and the execution restricting means may include means for restricting execution of the application or the content in a case where the execution is instructed and the predetermined component is not stored at a storage location that is indicated by the storage situation information.

According to an aspect of the present invention, the storage situation information storing means may store the storage situation information at a location that has a predetermined positional relation with the storage location of the predetermined component.

According to an aspect of the present invention, the information processing device may further include: prompting means for prompting user to input user identification information and a user password; and storage situation information updating means for updating the storage situation information that is stored in the storage means with information that indicates the current storage situation of the application or the content, in a case where the user identification information and user password input by the user are determined as valid according to user information storing means, which stores user identification information in association with a user password.

According to an aspect of the present invention, the storage situation information may include information that indicates a maximum storage capacity of the storage means in which the application or the content is stored, and the execution restricting means may include means for restricting execution of the application or the content in a case where the execution is instructed and the maximum storage capacity of the storage means in which the application or the content is stored differs from a maximum storage capacity that is indicated by the storage situation information.

According to an aspect of the present invention, the information processing device may further include: means for prompting user to input user identification information and a user password; and means for updating the storage situation information that is stored in the storage means with information that indicates a maximum storage capacity of the storage means in which the application or the content is currently stored, in a case where the user identification information and user password input by the user are determined as valid according to user information storing means, which stores user identification information in association with a user password.

Advantageous Effects of Invention

According to the present invention, it is possible to restrict the use of an application or content in an unauthorized device to which the application or the content is copied.

BRIEF DESCRIPTION OF DRAWINGS

FIG. 1 A diagram illustrating the overall configuration of a system for providing an application or content.

FIG. 2 A diagram illustrating an example of a user table.

DESCRIPTION OF EMBODIMENTS

Figure 3:
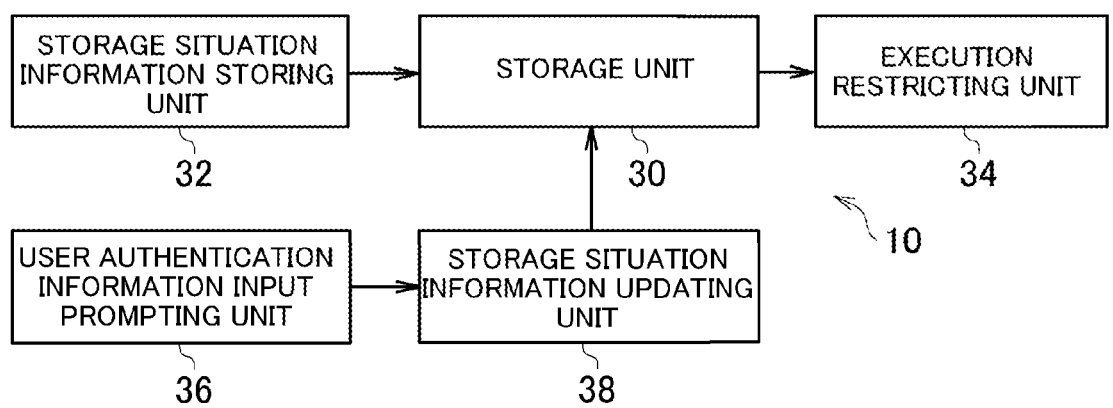
FIG. 3 A function block diagram of an information processing device according to an embodiment of the present invention.

An exemplary embodiment of the present invention is described in detail below with reference to the drawings.

FIG. 1 illustrates the overall configuration of a system for providing an application (application software) or content. As illustrated in FIG. 1, the application/content providing system 1 (the system for providing the application or the content) includes an information processing device 10 according to the embodiment of the present invention and a distribution system 20. The information processing device 10 and the distribution system 20 are connected to a communication network 2, which includes the Internet or the like, so that data can be communicated to/from each other.

The distribution system 20 includes one or more server computers. The distribution system 20 in the example of FIG. 1 includes a server 22 and a database 24. The server 22 is a device for distributing an application or content to the information processing device 10. The term "content" refers to, for example, an electronic book, an image, a video, or music.

The server 22 executes processing based on a processing request that is received from the information processing device 10. The server 22 includes, for example, a control unit (for example, CPU or the like), a main memory unit (RAM or the like), an auxiliary storage unit (for example, hard disk drive, solid state drive, or the like), and a communication interface.

The server 22 is allowed to access the database 24. The database 24 stores, for example, data about a user of the application/content providing system 1, and data about an application or content provided by the application/content providing system 1. The database 24 may be built in a server computer that is not the server 22, or may be built in the server 22.

The information processing device 10 is used for the enjoyment of an application or content. The information processing device 10 is, for example, a personal computer, a mobile phone, or a portable information terminal.

As illustrated in FIG. 1, the information processing device 10 includes a control unit 11, a main memory unit 12, an auxiliary storage unit 13, an operation unit 14, a communication interface 15, a display unit 16, an audio output unit 17, and an optical disc drive unit 18.

The control unit 11 includes, for example, one or more CPUs and executes information processing according to an operating system or a program that is stored in the auxiliary storage unit 13. The main memory unit 12 is a RAM, for example. The auxiliary storage unit 13 is, for example, a hard disk drive or a solid state drive.

The operation unit 14 is a key, a mouse, a stick, a touch panel, or the like. The communication interface 15 is an interface for connecting the information processing device 10 to the communication network 2. The display unit 16 is a liquid crystal display, for example. The audio output unit 17 is a speaker, for example. The optical disc drive unit 18 reads a program or data that is stored on an optical disc (information storage medium).

Programs and data are supplied to the auxiliary storage unit 13 via an optical disc, for example. Specifically, an optical disc storing a program or data is loaded in the optical disc drive unit 18, which reads the program or data stored in the optical disc, and the read program or data is stored in the auxiliary storage unit 13. The optical disc drive unit 18 is not an indispensable component. A component for reading a program or data that is stored in other information storage media than an optical disc (for example, a memory card) may be included in place of the optical disc drive unit 18 so that programs and data are supplied to the auxiliary storage unit 13 via other information storage media than an optical disc. Alternatively, programs and data may be supplied to the auxiliary storage unit 13 via the communication network 2.

In this embodiment, for example, a daemon program (HTTP daemon or the like) is activated on the server 22. An application for accessing the server 22 is activated on the information processing device 10. This application transmits a processing request (for example, an HTTP request) from the information processing device 10 to the server 22. The server 22 transmits a processing result (for example, an HTTP response) corresponding to the processing request to the information processing device 10. For instance, the server 22 transmits page data written in a predetermined description language (e.g., a web page description language) to the information processing device 10. A screen based on the processing result is displayed on the display unit of the information processing device 10, based on the page data.

The providing system 1 described above sells an application or content. For instance, the providing system 1 sells application software which include content data and a program for providing the content data to a user. To give another example, the providing system 1 sells content data that can be reproduced by a predetermined program. A user who wishes to obtain an application or content accesses the server 22 from the information processing device 10 to purchase the application or the content.

When a user attempts to purchase an application or content, a user authentication screen (not shown) is displayed on the display unit 16. The user authentication screen prompts the user to input a user ID and a user password. The user ID and the user password input on the user authentication screen are transmitted from the information processing device 10 to the server 22. According to a user table stored in the database 24, it is determined that whether this combination of the user ID and the user password is valid or not.

FIG. 2 illustrates an example of the user table stored in the database 24. The user table of FIG. 2 includes fields for "user ID", "user password", "credit card information", and "application/content information". A list of the IDs (identification information) of applications or contents that a user has obtained (purchased) legitimately is registered in the "application/content information" field.

When the combination of the user ID and the user password input on the user authentication screen is determined as valid, settlement processing is executed based on information registered in the "credit card information" field, for example. After the settlement processing is completed, the purchased application or content is downloaded onto the information processing device 10 and installed in the auxiliary storage unit 13.

Described below is a technology for restricting the use of an application or content in an unauthorized device in a case where the application or the content that is legitimately downloaded onto and stored in one information processing device 10 (authorized device) is copied to another information processing device 10 (unauthorized device). For the purpose of simplification, the following description focuses on a case where the "application or content" is a viewer application for viewing content (e.g., electronic book). This viewer application is an application that includes content data and a program for displaying the content data on the display unit 16.

FIG. 3 is a function block diagram illustrating function blocks that are relevant to the present invention out of function blocks that are implemented in the information processing device 10 according to this embodiment. As illustrated in FIG. 3, the information processing device 10 is described regarding a storage unit 30, a storage situation information storing unit 32, an execution restricting unit 34, a user authentication information input prompting unit 36, and a storage situation information updating unit 38.

For example, the storage unit 30 is the auxiliary storage unit 13. The storage situation information storing unit 32, the execution restricting unit 34, the user authentication information input prompting unit 36, and the storage situation information updating unit 38 are implemented by the control unit 11. In other words, in the case where the control unit 11 executes processing in accordance with a program, the control unit 11 functions as the storage situation information storing unit 32, the execution restricting unit 34, the user authentication information input prompting unit 36, and the storage situation information updating unit 38.

The following description deals with the storage unit 30, the storage situation information storing unit 32, and the execution restricting unit 34 first. After a complete description is given on the storage unit 30, the storage situation information storing unit 32, and the execution restricting unit 34, the user authentication information input prompting unit 36 and the storage situation information updating unit 38 are described.

Figure 4:
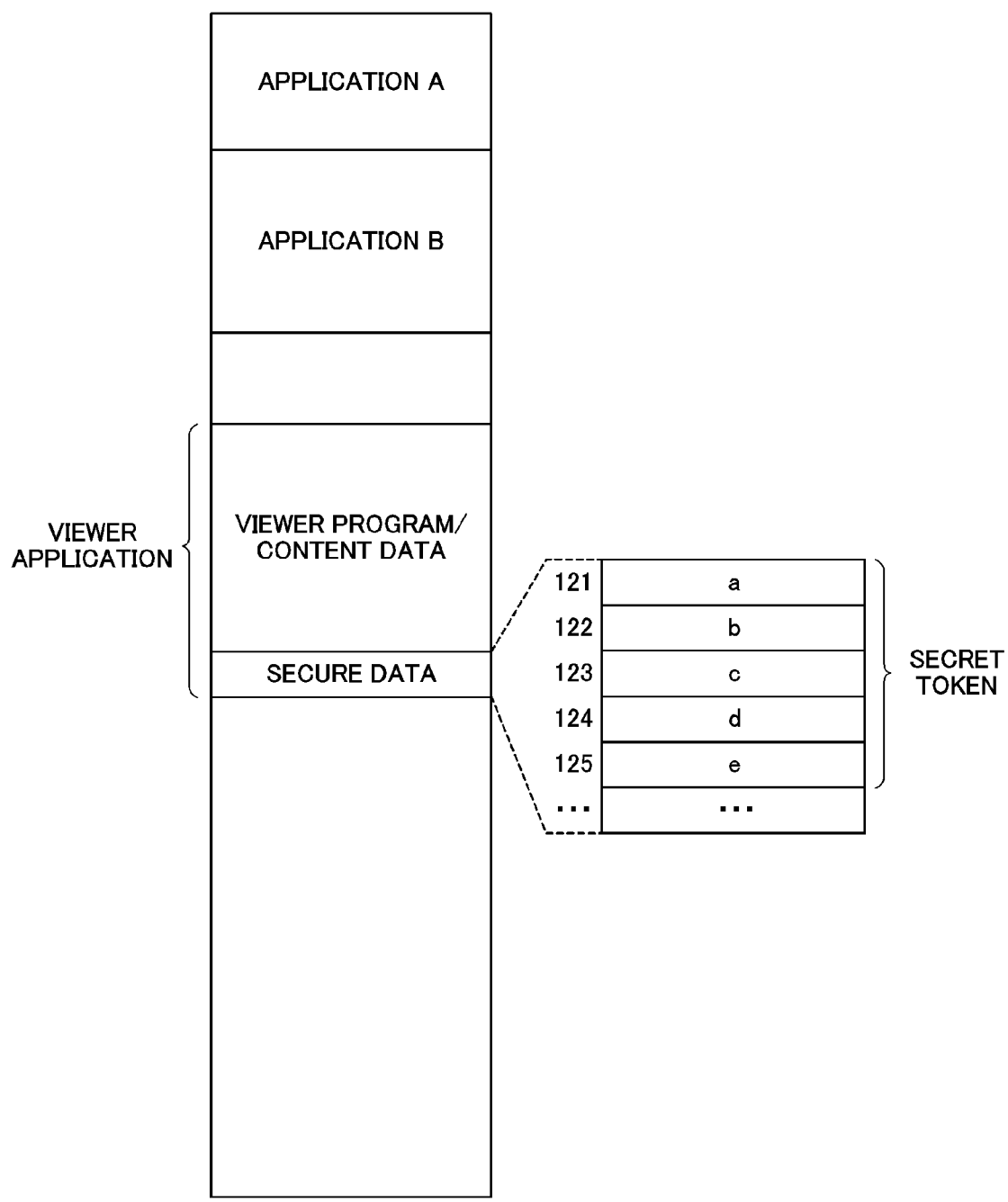
FIG. 4 A diagram illustrating an example of what is stored in a storage unit.

The storage unit 30 will be described. The storage unit 30 stores an application or content downloaded from the distribution system 20. FIG. 4 illustrates an example of what is stored in the storage unit 30. In the example of FIG. 4, applications A and B and the viewer application are installed in the storage unit 30. The viewer application includes a viewer program, content data, and secure data.

The secure data is protected such that other applications than the viewer application are prevented from accessing the secure data. Various types of information important to the execution of the viewer application are stored encrypted in the secure data. The secure data includes, for example, a secret token. The secret token is information that is a key to the execution of the viewer application (content). The secret token is an information string generated following a special rule and is distinguishable from other types of information. The secret token in the description given here is a symbol string made up of five symbols. The term "symbol" here means a symbol in a broad sense and includes, for example, letters and signs (symbols in a narrow sense). In the example of FIG. 4, the secret token is "abcde". Numbers "121" to "125" in FIG. 4 indicate locations (addresses) where the secret token is stored.

The storage situation information storing unit 32 will be described. The storage situation information storing unit 32 stores, in the storage unit 30, as one of components of an application or content stored (installed) in the storage unit 30, storage situation information which indicates the storage situation of the application or the content at predetermined reference timing.

The "predetermined reference timing" is at least predetermined timing that precedes the current time. For instance, the "predetermined reference timing" is a time when an application or content is stored (installed) in the storage unit 30. To give another example, the "predetermined reference timing" may be a time when an application or content stored (installed) in the storage unit 30 is executed for the first time.

The "storage situation information" includes, for example, information indicating the storage location (a physical storage location in a recording medium) of a predetermined component of an application or content in the storage unit 30.

"Storing storage situation information in the storage unit 30 as one of components of an application or content" means that the storage situation information is stored in the storage unit 30 so that, when the application or the content is copied to another information processing device 10, the storage situation information is copied along with the main body of the application or the content as a package.

The storage situation information storing unit 32 stores the storage situation information at a predetermined location in an area where the application or the content is stored. The "predetermined location" in this case is, for example, a location that has a predetermined positional relation with the storage location of the predetermined component. The "predetermined location" can be a place at the head of the area where the application or the content is stored, for example.

The operation of the storage situation information storing unit 32 will be described through a concrete example in which the viewer application of FIG. 4 is installed in the storage unit 30 and the secret token corresponds to the "predetermined component".

Figure 5:
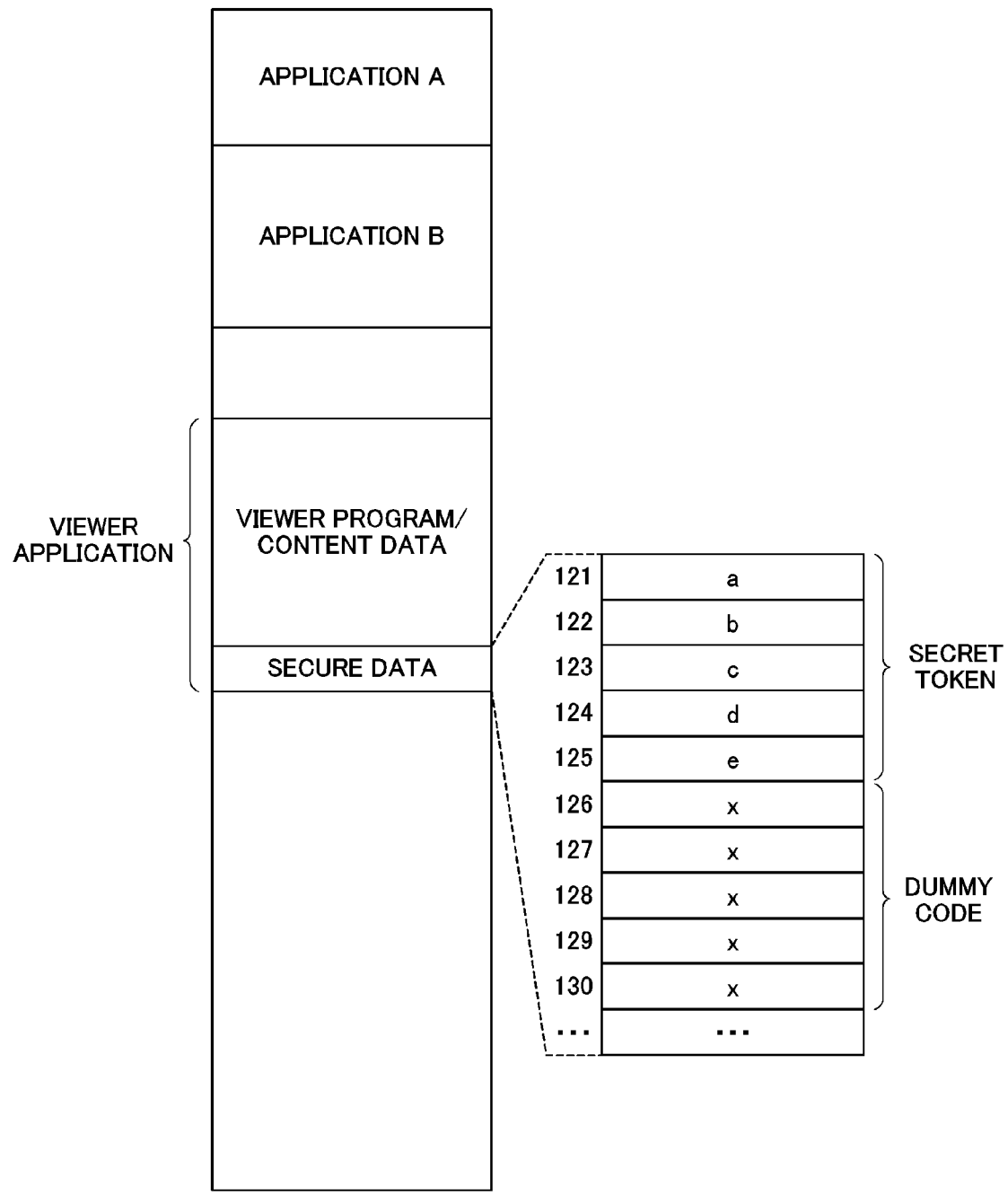
FIG. 5 A diagram illustrating another example of what is stored in the storage unit.
Figure 6:
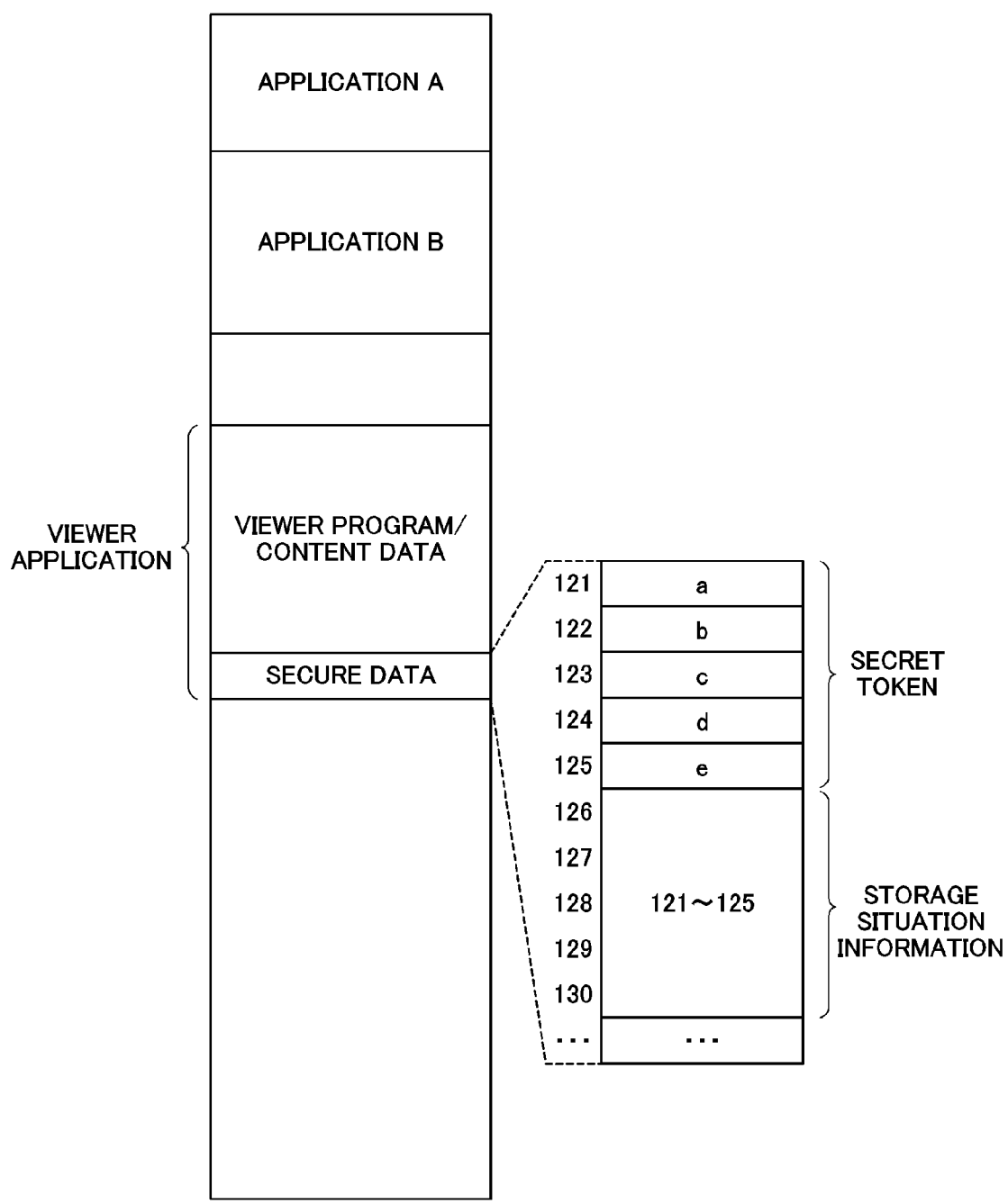
FIG. 6 A diagram illustrating still another example of what is stored in the storage unit.

FIGS. 5 and 6 are diagrams illustrating the concrete example of the operation of the storage situation information storing unit 32. In FIGS. 5 and 6, numbers "121" to "130" indicate locations (addresses) in the storage unit 30.

When the viewer application is installed in the storage unit 30, a symbol string (letter string) created by, for example, attaching a dummy code to the tail of the secret token is set in the secure data (see FIG. 5). In the example of FIG. 5, "abcde" corresponds to the secret token and "xxxxx" corresponds to the dummy code.

As described later, an area where the dummy code is stored is used to store the storage situation information (i.e., information indicating the storage location of the secret token). In other words, the dummy code plays the role of securing an area for storing the storage situation information. The size (length) of the dummy code is therefore determined by taking into account the size of the storage situation information.

The storage situation information storing unit 32 obtains the storage location of the secret token at the predetermined reference timing, and stores the storage situation information that indicates the obtained storage location in an area where the dummy code is stored (see FIG. 6). At this point, the dummy code is overwritten with the storage situation information that indicates the storage location of the secret token. The storage situation information is encrypted.

As illustrated in FIG. 6, the storage situation information in this case is stored right behind the storage location of the secret token. The positional relation between the storage location of the storage situation information and the storage location of the secret token (predetermined component) is not limited to the example of FIG. 6. For instance, the storage situation information may be stored right before the storage location of the secret token. The storage situation information may also be stored in a place distant from the storage location of the secret token as long as the place has a predetermined positional relation with the storage location of the secret token.

The execution restricting unit 34 will be described. When an instruction to execute an application or content is issued, the execution restricting unit 34 determines whether or not the current storage situation of the application or the content differs from a storage situation that is indicated by the storage situation information. In the case where the current storage situation of the application or the content differs from the storage situation that is indicated by the storage situation information, the execution restricting unit 34 restricts the execution of the application or the content. In other words, in the case where the current storage situation of the application or the content matches the storage situation that is indicated by the storage situation information, the execution restricting unit 34 allows the execution of the application or the content.

For instance, when the storage situation information includes information that indicates the storage location of a predetermined component of an application or content, the execution restricting unit 34 determines whether or not the predetermined component of the application or the content is stored at a storage location that is indicated by the storage situation information. In the case where the predetermined component of the application or the content is not stored at the storage location indicated by the storage situation information, the execution restricting unit 34 restricts the execution of the application or the content.

When what is stored in the storage unit 30 is as illustrated in FIG. 6 and the user uses the operation unit 14 to instruct to execute the viewer application, for example, the execution restricting unit 34 determines whether or not the storage location of the secret token (predetermined component) of the viewer application differs from a storage location that is indicated by the storage situation information. In the case where the storage location of the secret token of the viewer application differs from the storage location indicated by the storage situation information, the execution restricting unit 34 restricts (prevents) the execution of the viewer application. On the other hand, in the case where the storage location of the secret token of the viewer application does not differ from the storage location indicated by the storage situation information, the execution restricting unit 34 permits the execution of the viewer application.

Figure 7:
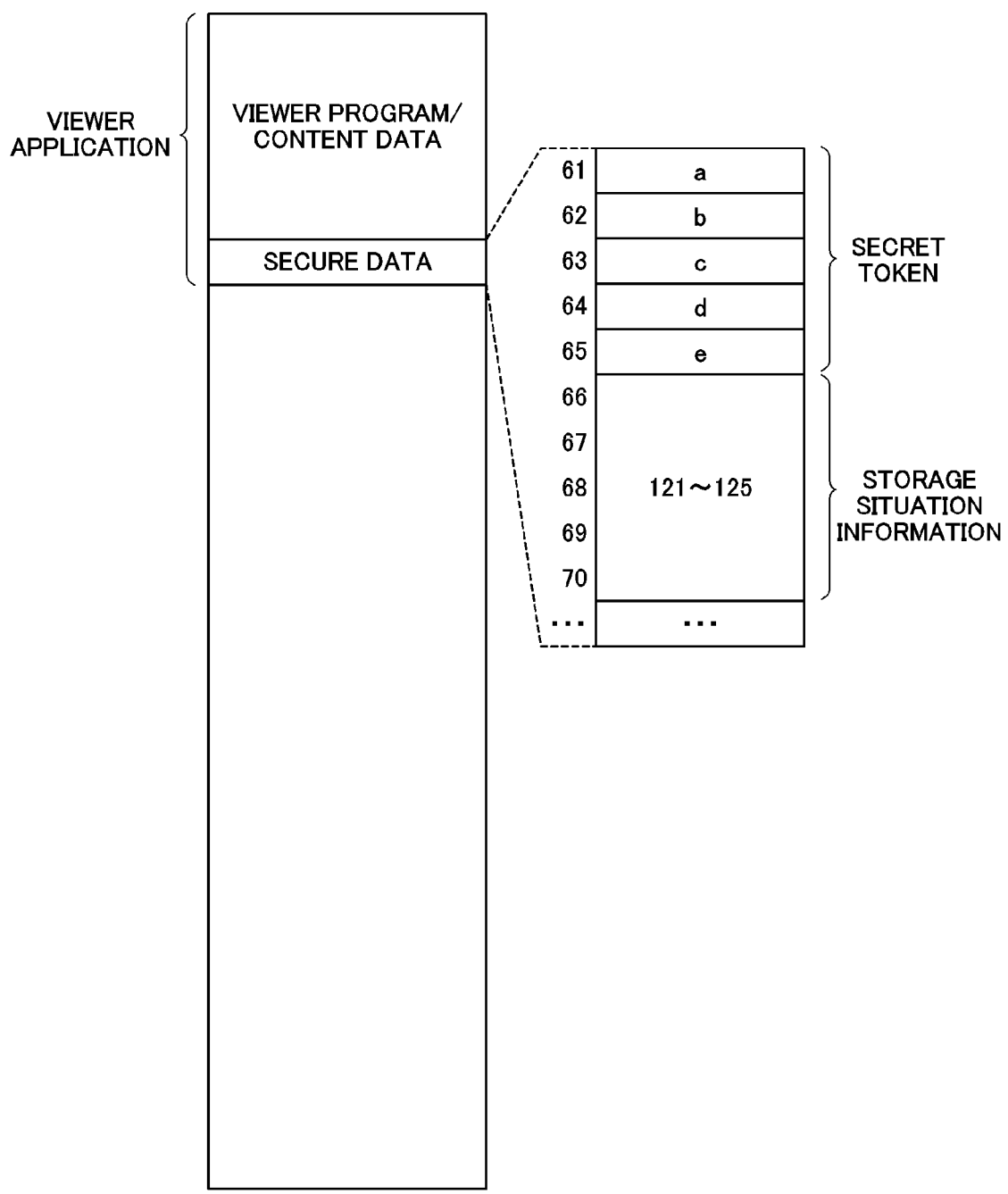
FIG. 7 A diagram illustrating yet still another example of what is stored in the storage unit.

A case is now discussed in which the viewer application legitimately downloaded onto and stored in the storage unit 30 of one information processing device 10 (authorized device) is copied to the storage unit 30 of another information processing device 10 (unauthorized device). FIG. 7 illustrates an example of what is stored in the storage unit 30 of the unauthorized device. In FIG. 7, numbers "61" to "70" indicate locations (addresses) in the storage unit 30.

When the viewer application stored in the storage unit 30 of the authorized device is copied to the storage unit 30 of the unauthorized device, it is very unlikely that the copied viewer application is stored at exactly the same storage location as the storage location in the storage unit 30 of the authorized device. The secret token of the copied viewer application is therefore stored at a location (for example, addresses 61 to 65) different from the storage location (addresses 121 to 125) in the storage unit 30 of the authorized device as illustrated in FIG. 7. Consequently, when an instruction to execute the viewer application is issued on the unauthorized device, the execution of the viewer application is restricted (prevented) because the actual storage location (addresses 61 to 65) of the secret token differs from a storage location (the addresses 121 to 125) that is indicated by the storage situation information.

The information processing device 10 according to this embodiment is thus capable of restricting the use of an application or content in an unauthorized device in the case where the application or content that is legitimately downloaded onto and stored in one information processing device 10 (authorized device) is copied to another information processing device 10 (unauthorized device).

Figure 8:
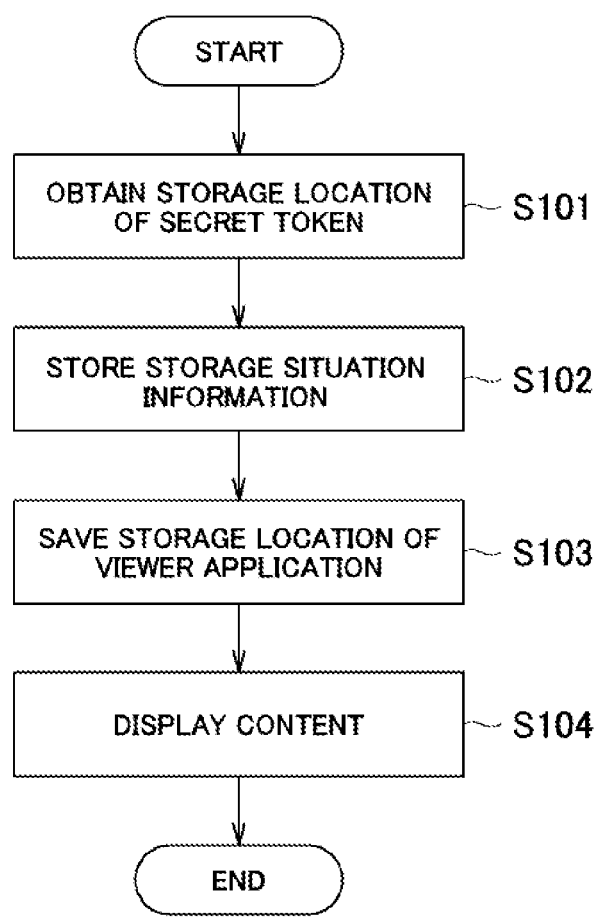
FIG. 8 A flow chart illustrating an example of processing that is executed in the information processing device.
Figure 9:
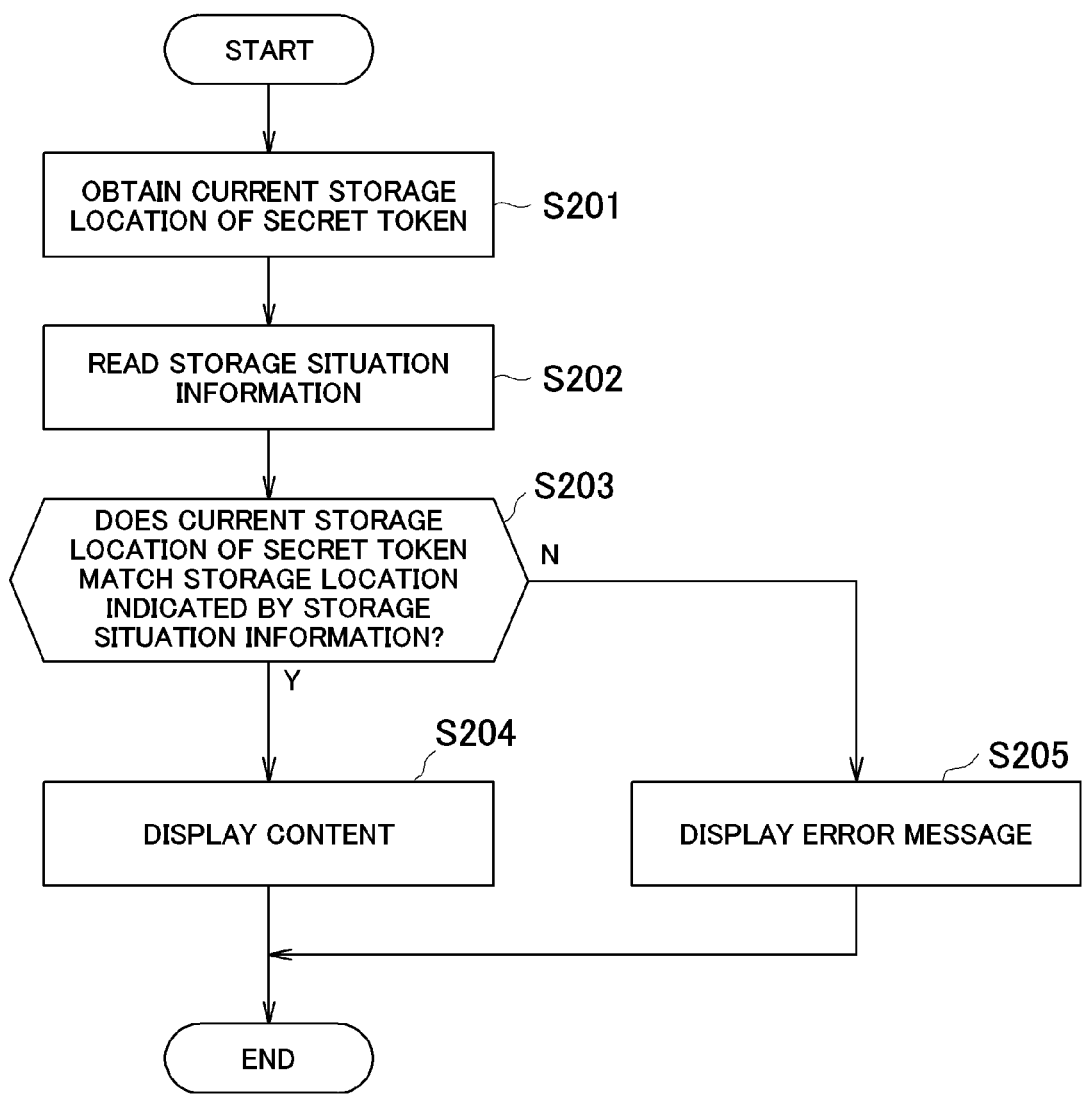
FIG. 9 A flow chart illustrating another example of processing that is executed in the information processing device.

The storage situation information storing unit 32 and execution restricting unit 34 described above are implemented by the control unit 11 executing processing in accordance with a program. The processing for implementing the storage situation information storing unit 32 and the execution restricting unit 34 is now described. FIGS. 8 and 9 are flow charts illustrating processing for implementing the storage situation information storing unit 32 and the execution restricting unit 34.

FIG. 8 illustrates an example of processing that is executed when the legitimately obtained viewer application is activated for the first time after the legitimately obtained viewer application installed in the information processing device 10. On the other hand, FIG. 9 illustrates an example of processing that is executed when the viewer application is activated for the second and subsequent times. The control unit 11 executes the processing of FIG. 8 and the processing of FIG. 9 in accordance with the viewer application (viewer program), thereby functioning as the storage situation information storing unit 32 and the execution restricting unit 34.

The processing of FIG. 8 will be described. As illustrated in FIG. 8, when the viewer application is activated for the first time, the control unit 11 first obtains the storage location of the secret token (S101).

Thereafter, the control unit 11 (storage situation information storing unit 32) encrypts the storage situation information that indicates the storage location obtained in Step S101, and stores the encrypted storage situation information in an area secured right behind the secret token (S102). In other words, the control unit 11 stores the encrypted storage situation information in an area where the dummy code is stored. The control unit 11 also saves the storage location of the viewer application to the auxiliary storage unit 13 (S103). The control unit 11 then executes processing for displaying content data on the display unit 16 (S104).

The processing of FIG. 9 will be described. As illustrated in FIG. 9, when the viewer application is activated for the second and subsequent times, the control unit 11 first obtains the actual storage location of the secret token (S201). The control unit 11 also reads the storage situation information that is stored right behind the secret token (S202). The control unit 11 determines whether or not the actual storage location of the secret token matches a storage location that is indicated by the storage situation information (S203).

In the case where the actual storage location of the secret token matches the storage location indicated by the storage situation information, the control unit 11 executes the processing for displaying content data on the display unit 16 (S204). On the other hand, in the case where the actual storage location of the secret token does not match the storage location indicated by the storage situation information, the control unit 11 (execution restricting unit 34) displays an error message on the display unit 16 (S205), and stops the activation of the viewer application (in other words, prevents the display unit 16 from displaying content data).

As described above, the information processing device 10 according to this embodiment is capable of restricting the use of an application or content in an unauthorized device in the case where the application or content that is legitimately downloaded onto and stored in one information processing device 10 (authorized device) is copied to another information processing device 10 (unauthorized device).

When defragmentation, for example, is executed in the information processing device 10 (authorized device) onto which an application or content has been downloaded legitimately (in other words, when data relocation in the storage unit 30 is executed in order to solve the fragmentation of a free area of the storage unit 30), the storage location of the application or the content is changed in some cases. In such cases, the execution of the application or the content is restricted due to the inconsistency between the actual storage location of the application or the content and a storage location that is indicated by the storage situation information. As a result, the user cannot use the application or the content, despite the fact that the user has legitimately obtained the application or the content.

Figure 10:
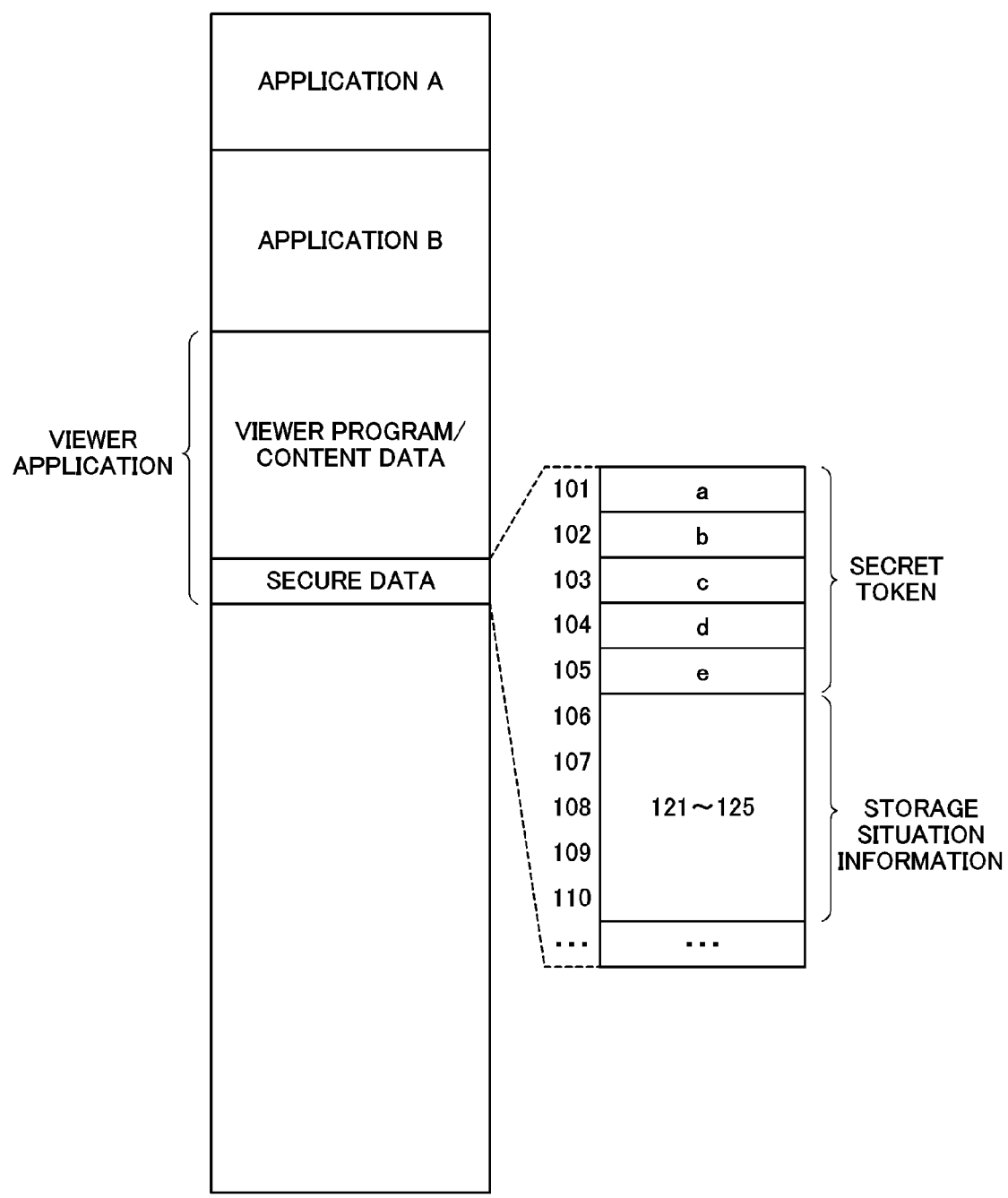
FIG. 10 A diagram illustrating yet still another example of what is stored in the storage unit.

FIG. 10 illustrates an example of the state of the storage unit 30 in the case where defragmentation is executed on the storage unit 30 that has been in a state illustrated in FIG. 6. The storage location of the secret token in the state of FIG. 10 is changed from the one in FIG. 6. The viewer application can no longer be activated in this case because the actual storage location (addresses 101 to 105) of the secret token differs from a storage location (the addresses 121 to 125) that is indicated by the storage situation information.

It is necessary to ensure that a legitimate user can continue to use an application or content after the situation described above occurs. The user authentication information input prompting unit 36 and the storage situation information updating unit 38 are function blocks therefor.

The user authentication information input prompting unit 36 is described. The user authentication information input prompting unit 36 prompts the user to input a user ID (user identification information) and a user password. For example, the user authentication information input prompting unit 36 displays the user authentication screen for inputting a user ID and a user password on the display unit 16.

The storage situation information updating unit 38 is described. When a user ID and a user password that are input by the user are determined as valid, the storage situation information updating unit 38 updates the storage situation information that is stored in the storage unit 30 as one of components of an application or content with the storage situation information that indicates the current storage situation of the application or the content.

Whether a user ID and a user password that are input by the user are valid or not is determined in, for example, the distribution system 20 (server 22) (details are described later: see FIG. 12).

Figure 11:
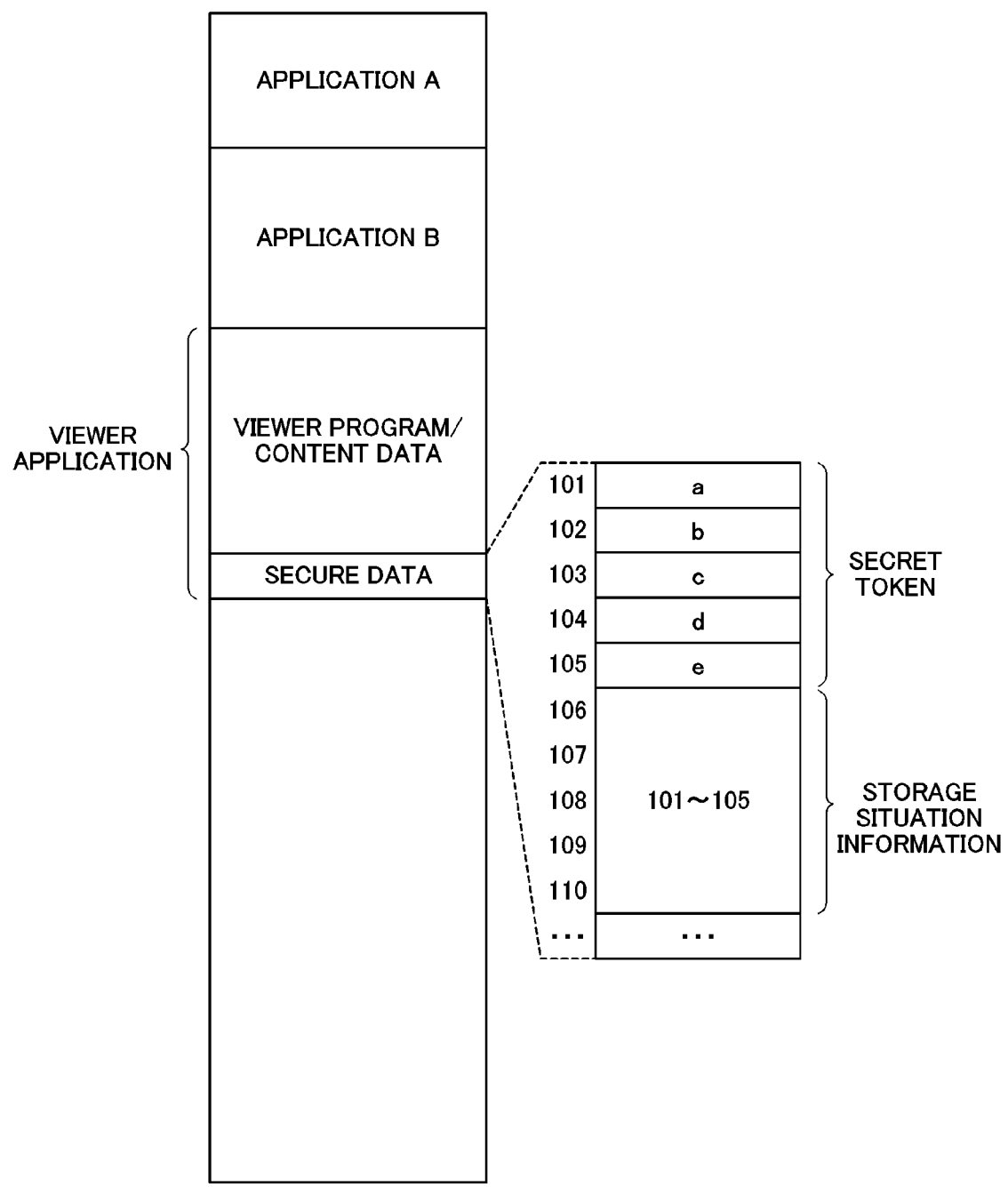
FIG. 11 A diagram illustrating yet still another example of what is stored in the storage unit.

With the user authentication information input prompting unit 36 and the storage situation information updating unit 38, if the state of the storage unit 30 is the state of FIG. 10, a legitimate user can turn the state of the storage unit 30 from FIG. 10 to FIG. 11, for example. In the state of FIG. 11, the actual storage location (addresses 101 to 105) of the secret token matches a storage location (addresses 101 to 105) that is indicated by the storage situation information, and the activation of the viewer application is therefore allowed. As a result, the user can use the viewer application.

Processing that is executed on the information processing device 10 in order to implement the user authentication information input prompting unit 36 and the storage situation information updating unit 38 is now described. FIG. 12 is a flow chart illustrating processing for implementing the user authentication information input prompting unit 36 and the storage situation information updating unit 38. FIG. 12 illustrates an example of processing that is executed when, for example, an error message is displayed in Step S205 of FIG. 9 and the execution of the viewer application is stopped. The control unit 11 executes the processing of FIG. 12 in accordance with the viewer application (viewer program), thereby functioning as the user authentication information input prompting unit 36 and the storage situation information updating unit 38.

Figure 12:
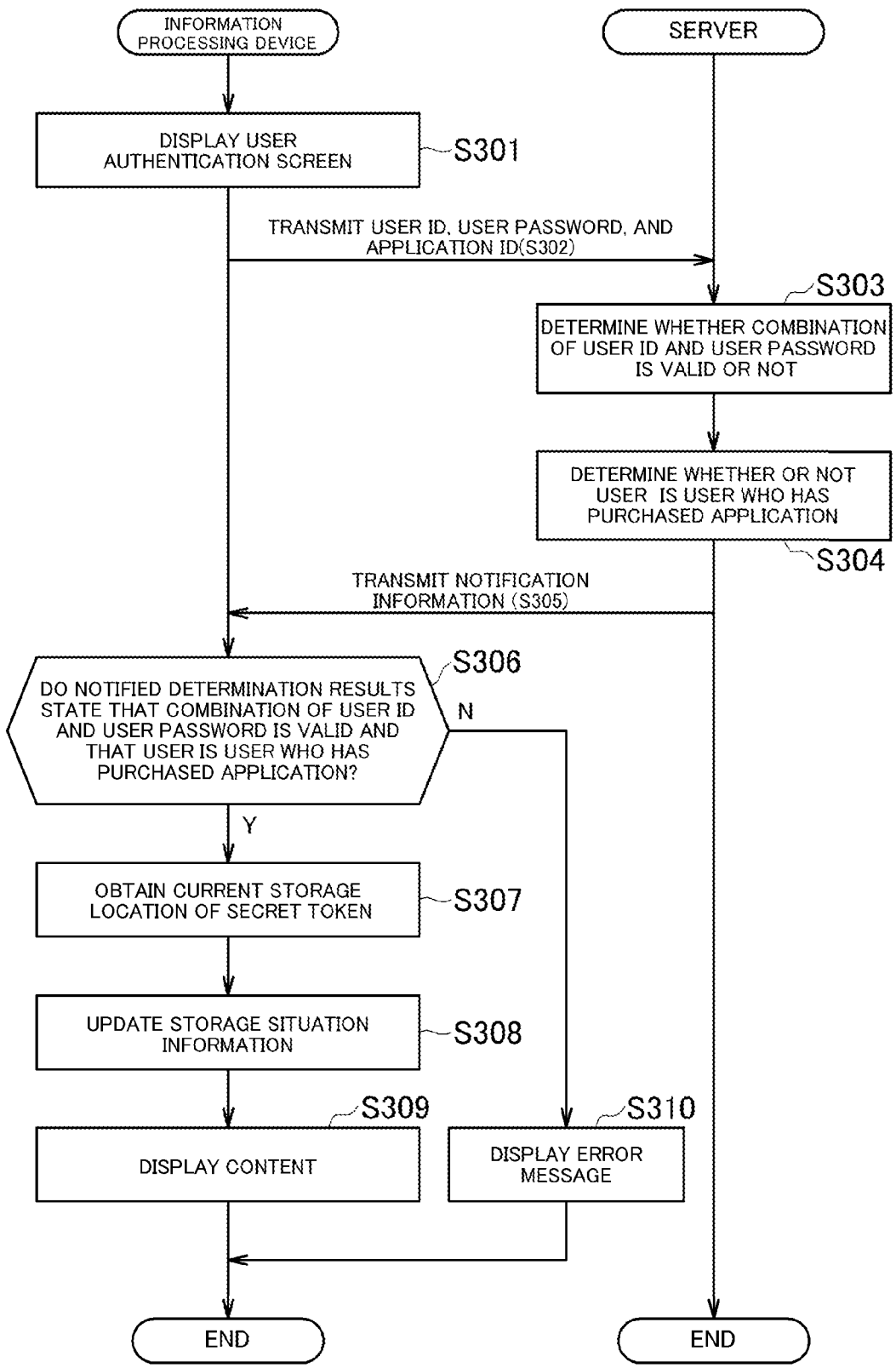
FIG. 12 A diagram illustrating an example of processing that is executed in the information processing device and a server.

As illustrated in FIG. 12, the control unit 11 (user authentication information input prompting unit 36) first displays the user authentication screen on the display unit 16 (S301). The user authentication screen prompts the user to input a user ID and a user password. The control unit 11 transmits to the server 22 the user ID and user password input on the user authentication screen, as well as the ID of the viewer application (S302).

When the user ID, the user password, and the viewer application ID are received by the server 22, the control unit of the server 22 refers to the user table (FIG. 2) stored in the database 24 (user authentication information storing means) to determine whether the received combination of the user ID and the user password is valid or not (S303). In the case where the received combination of the user ID and the user password is registered in the user table, the control unit of the server 22 determines the received combination of the user ID and the user password as valid.

The control unit of the server 22 also determines whether or not the user identified by the received user ID is a user who has purchased the viewer application (S304). Specifically, the control unit refers to the user table to determine whether or not the received viewer application ID is included in an application/content ID list registered in the "application/content information" field that is associated with the received user ID. In the case where the application/content ID list includes the received viewer application ID, the user is determined as a user who has purchased the viewer application.

The control unit of the server 22 transmits to the information processing device 10 notification information for notifying the results of the determination in Steps S303 and S304 (S305). When the notification information is received by the information processing device 10, the control unit 11 determines whether or not the determination results notified by the server 22 state that the combination of the user ID and the user password is valid and that the user is a user who has purchased the viewer application (S306).

In the case where the determination results notified by the server 22 state that the combination of the user ID and the user password is valid and that the user is a user who has purchased the viewer application, the control unit 11 obtains the current storage location of the secret token of the viewer application (S307). The control unit 11 (storage situation information updating unit 38) encrypts information that indicates the storage location obtained in S307, and updates the storage situation information that has been stored in an area right behind the area storing the secret token with the encrypted information (S308). The control unit 11 then executes the processing for displaying content data on the display unit 16 (S309).

On the other hand, in the case where at least one of the determination result stating that the combination of the user ID and the user password is not valid and the determination result stating that the user is not a user who has purchased the viewer application is notified by the server 22, the control unit 11 displays an error message on the display unit 16 (S310), and stops the activation of the viewer application.

The continued use of an application or content can thus be ensured for a user who has legitimately obtained the application or the content even after the execution of defragmentation or the like creates inconsistency between the actual storage location of the application or the content and a storage location that is indicated by the storage situation information.

The present invention is not limited to the embodiment described above.

[1] For instance, the "storage situation information" may include information about the storage unit 30 (auxiliary storage unit 13) which stores an application or content. Specifically, the "storage situation information" may include information that indicates the maximum storage capacity (e.g., maximum physical storage capacity) of the storage unit 30 which stores an application or content.

Figure 13:
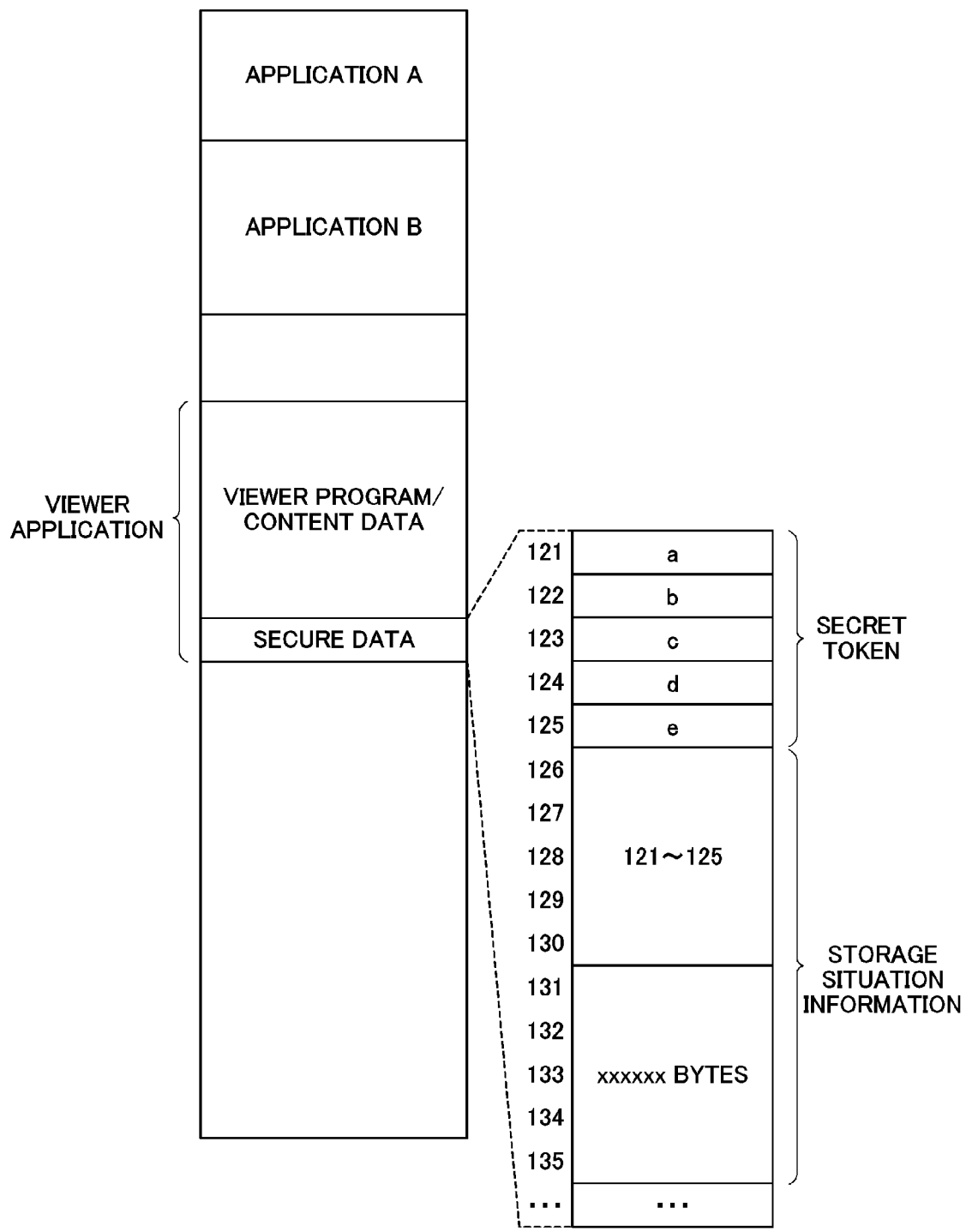
FIG. 13 A diagram illustrating yet still another example of what is stored in the storage unit.

[1-1] FIG. 13 illustrates an example of what is stored in the storage unit 30 when the storage situation information includes information that indicates the storage location in the storage unit 30 of a predetermined component of an application or content (addresses 126 to 130), and information that indicates the maximum storage capacity of the storage unit 30 in which the application or the content is stored (addresses 131 to 135).

Figure 14:
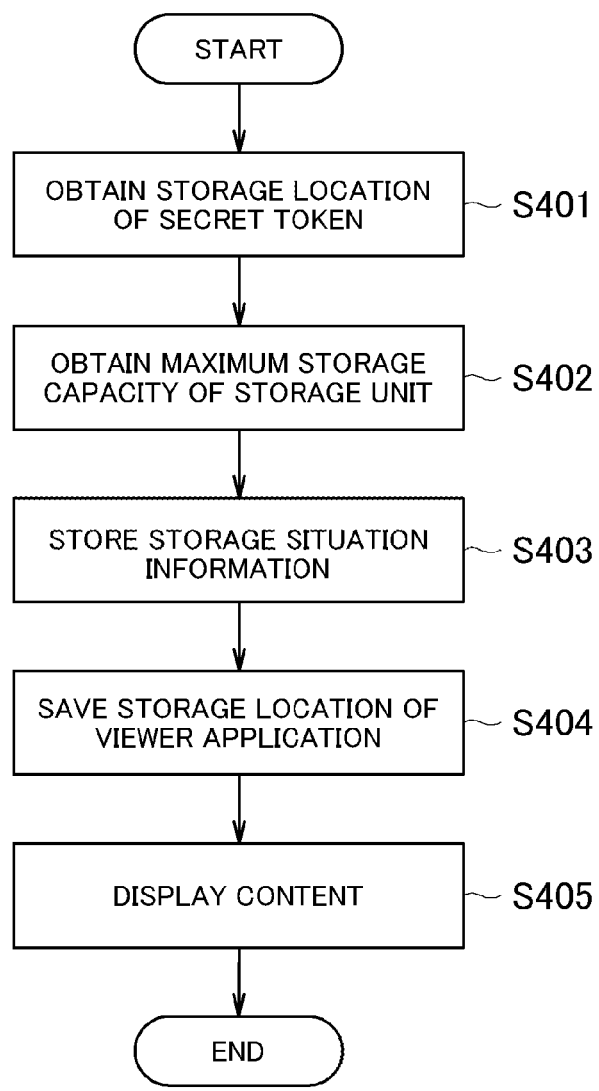
FIG. 14 A flow chart illustrating still another example of processing that is executed in the information processing device.
Figure 15:
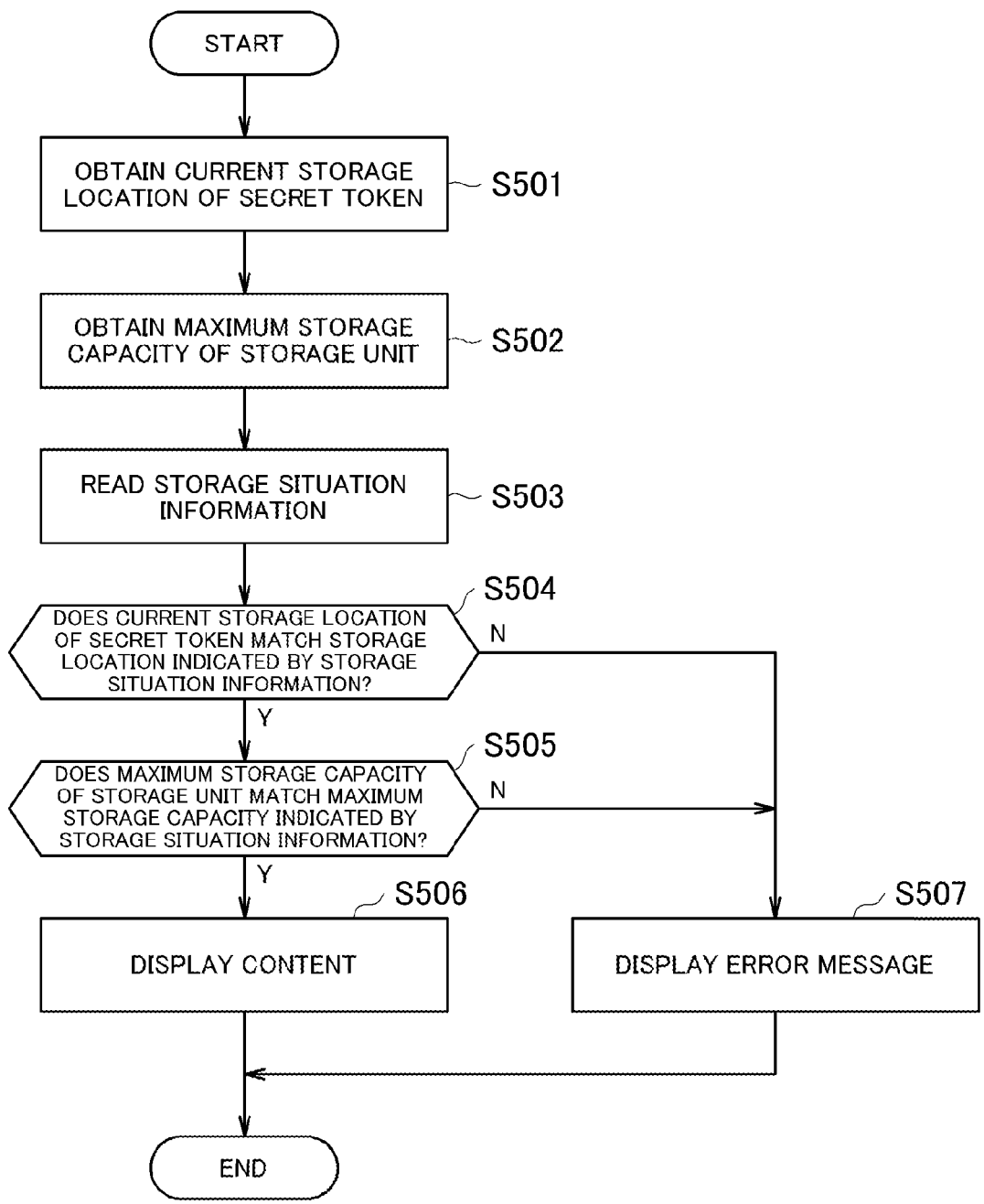
FIG. 15 A flow chart illustrating yet still another example of processing that is executed in the information processing device.

In this case, processing illustrated in FIG. 14 is executed in place of the processing of FIG. 8, and processing illustrated in FIG. 15 is executed in place of the processing of FIG. 9.

The processing of FIG. 14 will be described. Step S401 of FIG. 14 is the same as Step S101 of FIG. 8. After the processing of Step S401 is executed, the control unit 11 obtains the maximum storage capacity of the storage unit 30 in which the viewer application is installed (S402). The control unit 11 (storage situation information storing unit 32) encrypts the storage situation information that indicates the storage location obtained in Step S401 and the maximum storage capacity obtained in Step S402, and stores the encrypted storage situation information in an area secured right behind the secret token (S403). The control unit 11 also saves the storage location of the viewer application to the auxiliary storage unit 13 (S404). The control unit 11 then executes processing for displaying content data on the display unit 16 (S405).

The processing of FIG. 15 will be described. Step S501 of FIG. 15 is the same as Step S201 of FIG. 9. After the processing of Step S501 is executed, the control unit 11 obtains the maximum storage capacity of the storage unit 30 in which the viewer application is installed (S502).

The control unit 11 also reads the storage situation information that is stored right behind the secret token (S503). The control unit 11 determines whether or not the actual storage location of the secret token matches a storage location that is indicated by the storage situation information (S504).

In the case where the actual storage location of the secret token matches the storage location indicated by the storage situation information, the control unit 11 determines whether or not the maximum storage capacity of the storage unit 30 in which the viewer application is installed matches a maximum storage capacity that is indicated by the storage situation information (S505).

In the case where the maximum storage capacity of the storage unit 30 in which the viewer application is installed matches the maximum storage capacity indicated by the storage situation information, the control unit 11 executes the processing for displaying content data on the display unit 16 (S506).

In the case where it is determined in Step S504 that the actual storage location of the secret token does not match the storage location indicated by the storage situation information, or in the case where it is determined in Step S505 that the maximum storage capacity of the storage unit 30 in which the viewer application is installed does not match the maximum storage capacity indicated by the storage situation information, the control unit 11 (execution restricting unit 34) displays an error message on the display unit 16 (S507), and stops the activation of the viewer application (in other words, prevents the display unit 16 from displaying content data).

A case is now discussed in which the viewer application legitimately downloaded onto and stored in the storage unit 30 of one information processing device 10 (authorized device) is copied to the storage unit 30 of another information processing device (unauthorized device).

In the case where the viewer application stored in the storage unit 30 of the authorized device is copied to the storage unit 30 of the unauthorized device, it is very unlikely that the storage unit 30 of the unauthorized device has a maximum storage capacity that is an exact match to the maximum storage capacity of the storage unit 30 of the authorized device. Consequently, when an instruction to execute the viewer application is issued on the unauthorized device, the execution of the viewer application is restricted (prevented) due to the inconsistency between the maximum storage capacity of the storage unit 30 (the storage unit 30 of the unauthorized device) in which the copied viewer application is stored and the maximum storage capacity of a storage unit (the storage unit 30 of the authorized device) that is indicated by the storage situation information. In short, this makes even more sure that the use of an application or content in an unauthorized device is restricted in the case where the application or content that is stored in an authorized device is copied to the unauthorized device.

In the case where an error message is displayed in Step S507 of FIG. 15 and the execution of the viewer application is stopped, the processing of FIG. 12 described above may be executed. In Step S307 of FIG. 12, the control unit 11 in this case may obtain the maximum storage capacity of the storage unit 30 in which the viewer application is installed, as well as the current storage location of the secret token. In Step S308, the control unit 11 encrypts the storage situation information that indicates the storage location and maximum storage capacity obtained in Step S307 so that the storage situation information that is stored in an area right behind the area storing the secret token is updated with the encrypted information.

[1-2] The "storage situation information" may include only information that indicates the maximum storage capacity (e.g., maximum physical storage capacity) of the storage unit 30 (auxiliary storage unit 13) which stores an application or content.

Figure 16:
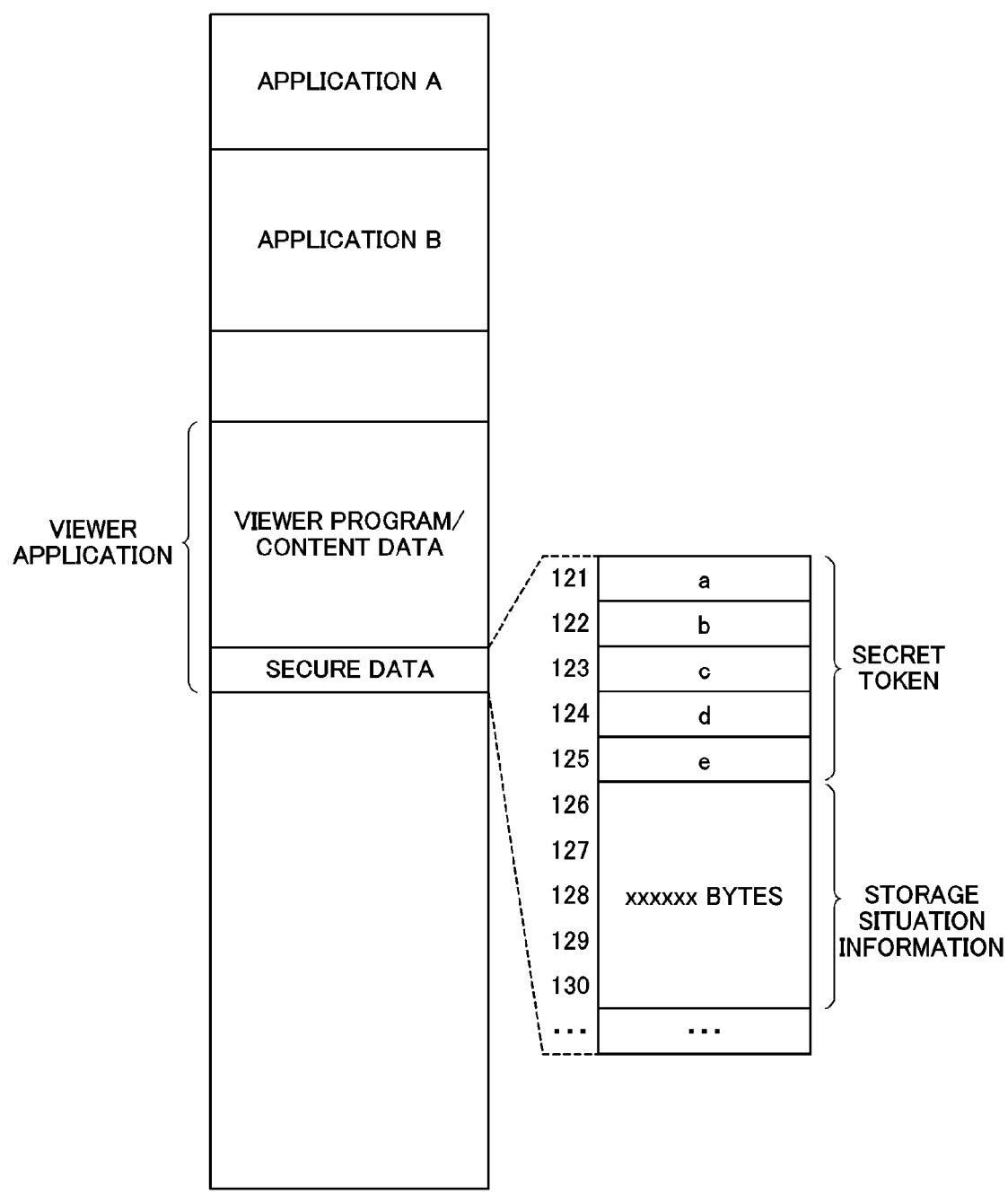
FIG. 16 A diagram illustrating yet still another example of what is stored in the storage unit.

FIG. 16 illustrates an example of what is stored in the storage unit 30 in the case where the storage situation information includes only information that indicates the maximum storage capacity of the storage unit 30 which stores an application or content.

In this case, the processing of Step S401 is omitted from the processing of FIG. 14. In Step S403, the control unit 11 encrypts the storage situation information that indicates the maximum storage capacity obtained in Step S402, and stores the encrypted storage situation information in an area secured right behind the secret token.

The processing of Steps S501 and S504 are also omitted from the processing of FIG. 15. In the case where an error message is displayed in Step S507 and the execution of the viewer application is stopped, the processing of FIG. 12 described above may be executed. In Step S307 of FIG. 12, the control unit 11 in this case may obtain the maximum storage capacity of the storage unit 30 in which the viewer application is installed. In Step S308, the control unit 11 encrypts the storage situation information that indicates the maximum storage capacity obtained in Step S307 so that the storage situation information that is stored in an area right behind the area storing the secret token is updated with the encrypted information.

[1-3] The storage situation information is not limited to the examples given above. For instance, the storage situation information can be information that is about the storage situation of an application or content and that is inconsistent between an authorized device and an unauthorized device in the case where the application or the content stored in the authorized device is copied to the unauthorized device.

[2] Applications executed on the information processing device 10 are not limited to those that provide a user with content (e.g., an electronic book, an image, a video, music, or a game), and can be, for example, text editors and similar applications.

The invention claimed is:

1. An information processing device, comprising:
   storage situation information storing means for storing, in storage means where an application or content is stored, storage situation information which indicates a storage situation of the application or the content at predetermined reference timing, as one of components of the application or the content;
   execution restricting means for restricting execution of the application or the content in a case where the execution is instructed and a current storage situation of the application or the content differs from a storage situation that is indicated by the storage situation information;
   prompting means for prompting a user to input user identification information and a user password; and
   storage situation information updating means for updating the storage situation information that is stored in the storage means with information that indicates the current storage situation of the application or the content, in a case where the user identification information and user password input by the user are determined as valid according to user information storing means, which stores user identification information in association with a user password.

2. The information processing device according to claim 1, wherein the storage situation information comprises information that indicates a storage location of a predetermined component of the application or the content, and
   wherein the execution restricting means comprises means for restricting execution of the application or the content in a case where the execution is instructed and the predetermined component is not stored at the storage location that is indicated by the storage situation information.

3. The information processing device according to claim 2, wherein the storage situation information storing means stores the storage situation information at a location that has a predetermined positional relation with the storage location of the predetermined component.

4. An information processing device, comprising:
   storage situation information storing means for storing, in storage means where an application or content is stored, storage situation information which indicates a storage situation of the application or the content at predetermined reference timing, as one of components of the application or the content; and
   execution restricting means for restricting execution of the application or the content in a case where the execution is instructed and a current storage situation of the application or the content differs from a storage situation that is indicated by the storage situation information,
   wherein the storage situation information comprises information that indicates a maximum storage capacity of the storage means in which the application or the content is stored, and
   wherein the execution restricting means comprises means for restricting execution of the application or the content in a case where the execution is instructed and the maximum storage capacity of the storage means in which the application or the content is stored differs from a maximum storage capacity that is indicated by the storage situation information.

5. The information processing device according to claim 4, further comprising:
   means for prompting a user to input user identification information and a user password; and
   means for updating the storage situation information that is stored in the storage means with information that indicates a maximum storage capacity of the storage means in which the application or the content is currently stored, in a case where the user identification information and user password input by the user are determined as valid according to user information storing means, which stores user identification information in association with a user password.

6. A method of controlling an information processing device, comprising:
- storing, in a storage where an application or content is stored, storage situation information which indicates a storage situation of the application or the content at predetermined reference timing, as one of components of the application or the content;
- restricting execution of the application or the content in a case where the execution is instructed and a current storage situation of the application or the content differs from a storage situation that is indicated by the storage situation information;
- prompting a user to input user identification information and a user password; and
- updating the storage situation information that is stored in the storage with information that indicates the current storage situation of the application or the content, in a case where the user identification information and user password input by the user are determined as valid according to a user information storage, which stores user identification information in association with a user password.

7. A method of controlling an information processing device, comprising:
- storing, in a storage where an application or content is stored, storage situation information which indicates a storage situation of the application or the content at predetermined reference timing, as one of components of the application or the content; and
- restricting execution of the application or the content in a case where the execution is instructed and a current storage situation of the application or the content differs from a storage situation that is indicated by the storage situation information,
- wherein the storage situation information comprises information that indicates a maximum storage capacity of the storage in which the application or the content is stored, and
- wherein the restricting comprises restricting execution of the application or the content in a case where the execution is instructed and the maximum storage capacity of the storage in which the application or the content is stored differs from a maximum storage capacity that is indicated by the storage situation information.

* * * * *